United States Patent [19]
Kendall

[11] Patent Number: 5,775,233
[45] Date of Patent: Jul. 7, 1998

[54] INTEGRATED TRIPOD RISER

[76] Inventor: Charles S. Kendall, 6553 Kelsey Point Cir., Alexandria, Va. 22315

[21] Appl. No.: 827,493

[22] Filed: Mar. 28, 1997

[51] Int. Cl.⁶ ............................................. A47B 57/00
[52] U.S. Cl. ........................... 108/59; 108/115; 108/94
[58] Field of Search .................... 108/59, 28, 115, 108/128, 91, 94, 95; 248/436, 170, 167, 460

[56] References Cited

U.S. PATENT DOCUMENTS

| Re. 30,020 | 6/1979 | Spencer et al. | 248/167 X |
|---|---|---|---|
| 1,576,716 | 3/1926 | Casgrain | 108/94 X |
| 4,763,582 | 8/1988 | Rigsby | 108/94 X |
| 5,205,223 | 4/1993 | Ball et al. | 108/115 X |
| 5,463,945 | 11/1995 | Kendall | 108/59 |
| 5,473,996 | 12/1995 | Kendall | 108/59 |
| 5,520,122 | 5/1996 | Fischer | 108/95 X |

*Primary Examiner*—Jose V. Chen
*Attorney, Agent, or Firm*—Randy W. Lacasse

[57] ABSTRACT

A stand or platform is integrated directly within the profile of a collapsed tripod riser for easy transport of the device. The tripod riser uses a single center post configuration, with a first support leg rigidly attached thereto and second and third support legs rotatable around the center post support. A unique center post locking system allows multiple-height single-plane nesting of the legs. In addition, the integrated stand is retained within the same plane of the nested support legs and within a cavity created by the interior profile cavity created by the support legs during a collapsed and transport position.

13 Claims, 5 Drawing Sheets

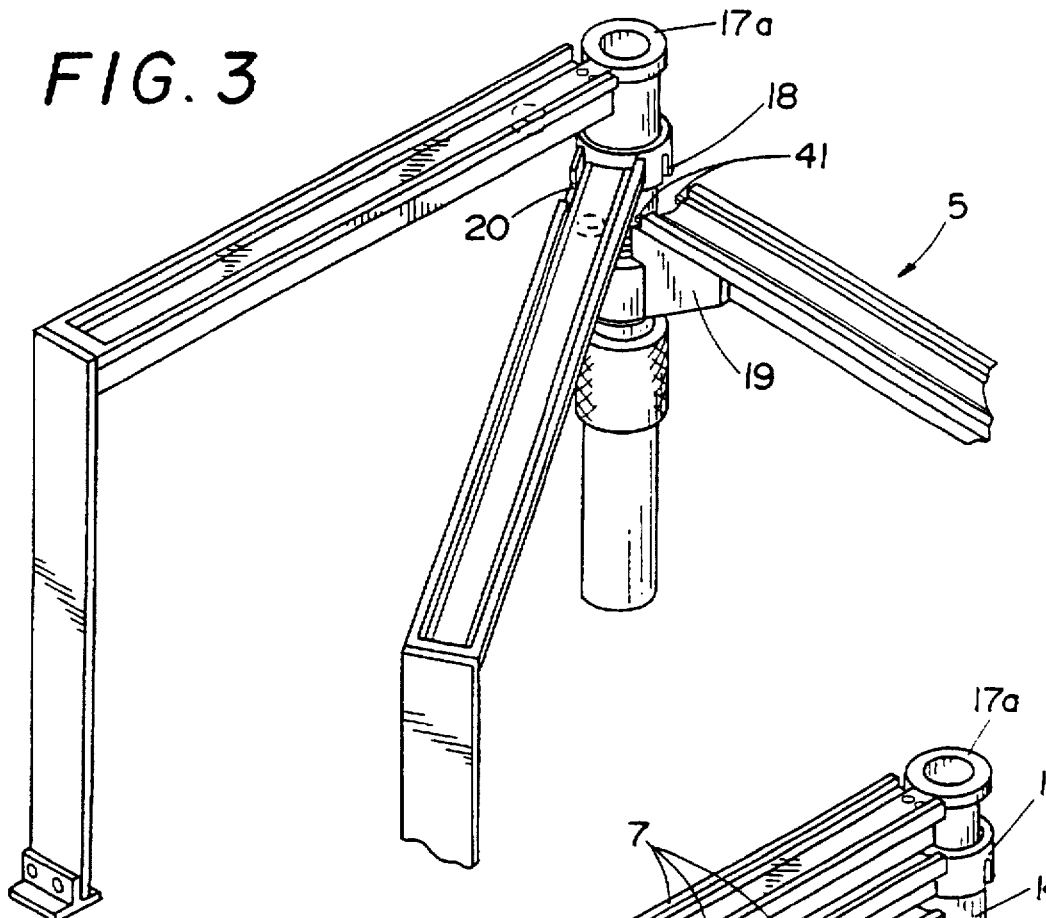
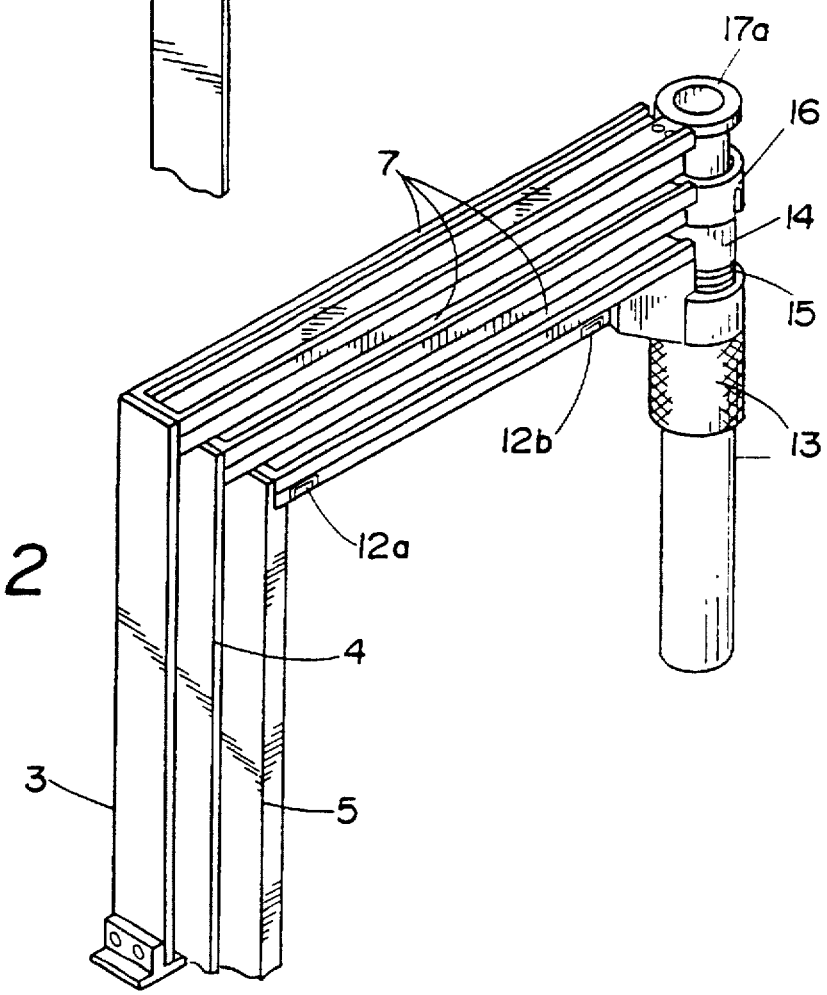

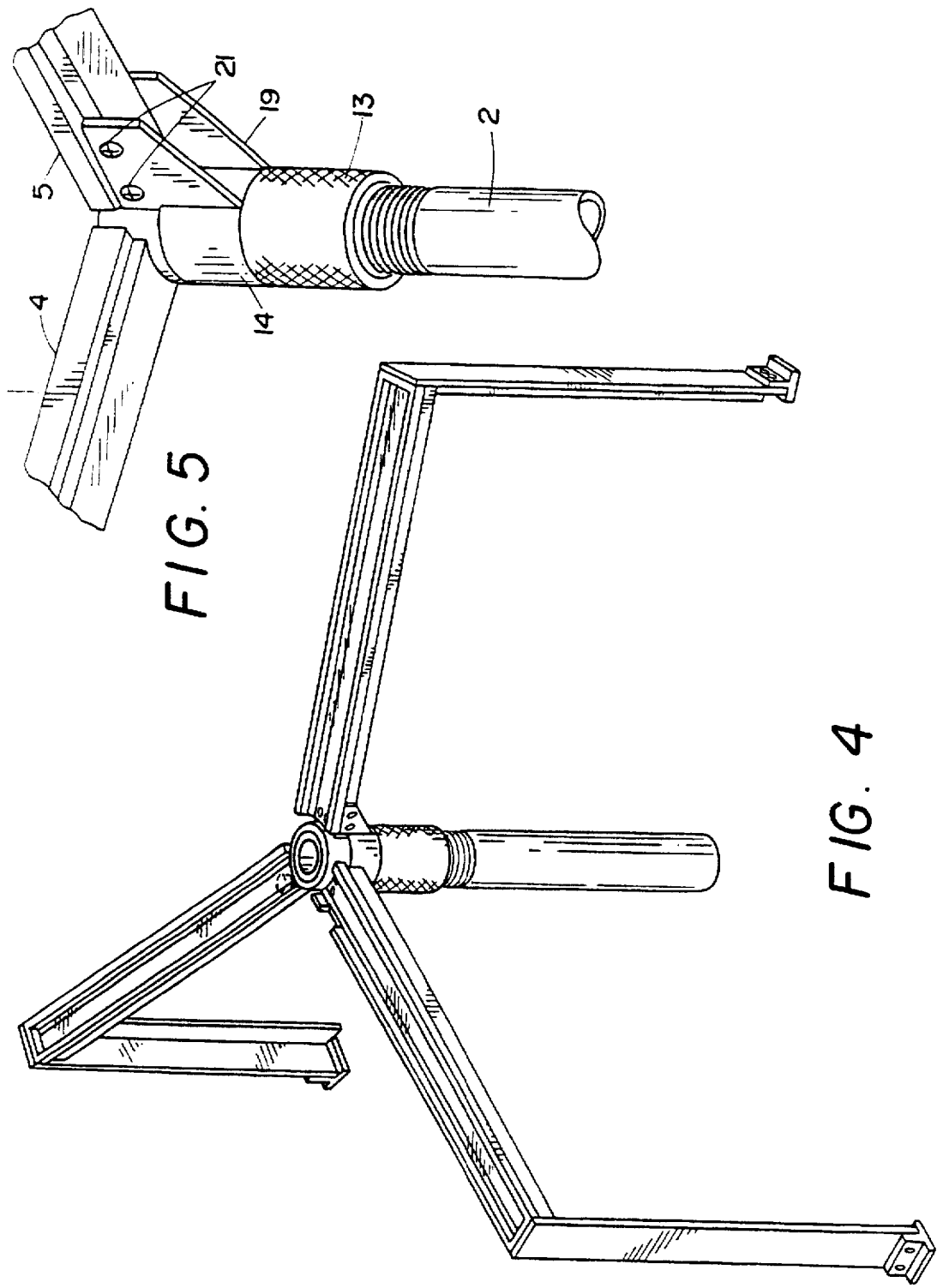

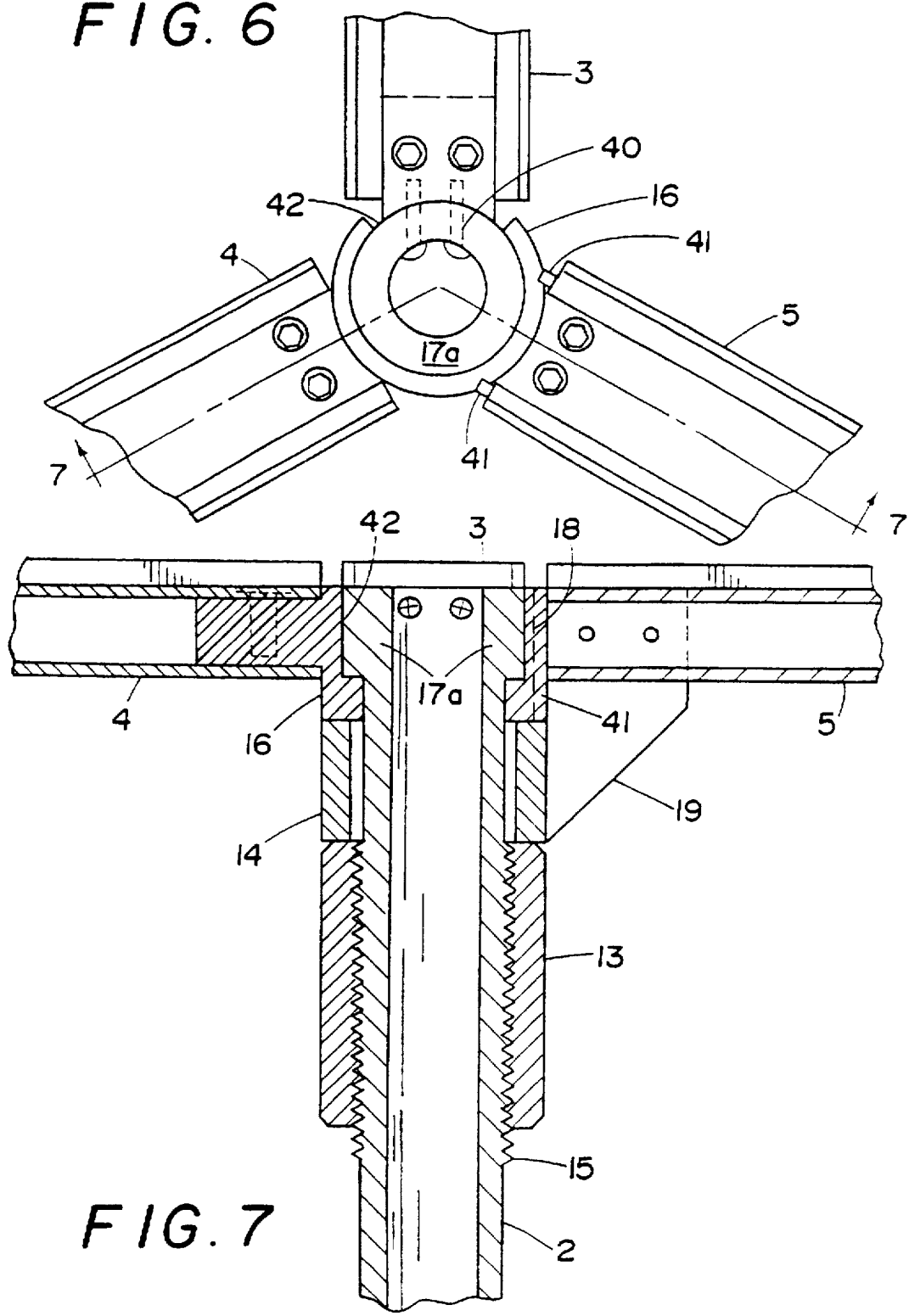

INTEGRATED TRIPOD RISER

BACKGROUND OF THE INVENTION

1. Field of Invention

The present invention relates generally to the field of camera equipment. More specifically, the present invention is related to a portable tripod riser system with a unique nested support system an integrated stand.

2. Discussion of Prior Art

The prior art comprises portable tripod riser U.S. Pat. Nos. 5,463,945 and 5,473,996 and co-pending application Ser. No. 08/568,240, commonly owned by Charles S. Kendall, hereby incorporated by reference. The present invention uses the basic functions as taught in the earlier patents in a new and different configuration not previously taught or suggested by the prior art.

Whatever the precise merits, features, and advantages of the above cited references, none of them achieve or fulfills the purposes of the present invention. Accordingly, it is an object of the present invention to provides for a new and useful tripod riser.

It is another object of the present invention to integrate a tripod riser stand within a nested leg support structure.

It is an additional object of the present invention to make said above device lightweight and easy to carry.

It is an additional object of the present invention to make said above device quick to set-up and take down.

It is an additional object of the present invention to make said above device sturdy to remove unwanted vibrations while in use.

These and other objects are achieved by the detailed description that follows.

SUMMARY OF THE INVENTION

The present invention improves on the prior art by using nesting techniques to create a more compact tripod riser while in a transport configuration. In addition, in the nested configuration, a user stand is integrated directly within the entire profile. The device uses a single center post structure with a first support leg rigidly attached thereto and second and third support legs rotatable around said center post support. A unique center post locking system allows multiple-height single-plane nesting of said legs. In addition, the integrated stand is retained within the same plane of the nested support legs and within a cavity created by the interior profile cavity created by said support legs during collapsed and transport position.

BRIEF DESCRIPTION OF THE DRAWINGS

FIG. 2 illustrates the structure as shown in FIG. 1 with the integrated stand removed.

FIG. 3 illustrates the structure of FIG. 2 as the second and third legs are being moved into separated positions.

FIG. 4 illustrates the completed separation and setup of FIG. 3.

FIG. 5 illustrates the attachment of two of the support legs to the center support.

FIG. 6 illustrates a top view of the interlocking structure of the center support structure while in the setup position.

FIG. 7 illustrates a cutaway side view of the interlocking structure of the center support structure while in the setup position.

DESCRIPTION OF THE PREFERRED EMBODIMENTS

Figure 1A:
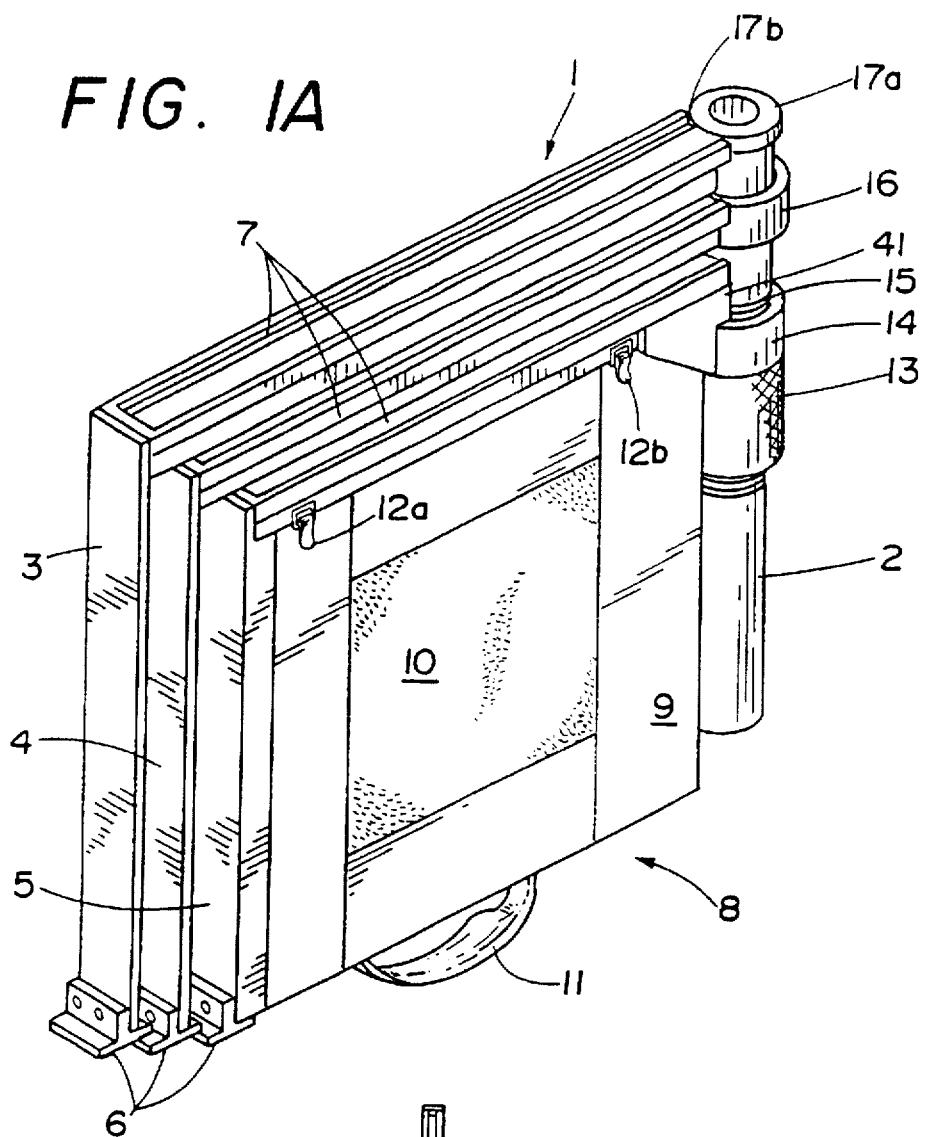
FIG. 1a illustrates a bottom perspective view of the present invention in its pre-transport configuration illustrating the nested legs and integrated stand.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

FIG. 1a illustrates a bottom view of the present invention in its transport configuration. The tripod riser 1 retains integrated stand 8 within the interior profile of the third leg 5. The stand 8 is locked onto third leg 5 by locks 12a and 12b which, in the preferred embodiment, comprise standard latches. Equivalent retaining means such as straps, etc. could be substituted without departing from the spirit of the present invention. The stand includes a top perimeter support surface 9 with a textured non-slip center 10. In the preferred embodiment, a section of low pile carpet or rubber is retained within a center section 10 that is slightly lower (i.e. the height of the pile) than the top outer surface 9. This configuration allows a user standing on the stand to detect movement from the center to the edge. Upon noting a different texture or height differential, the user would move back closer to the center to prevent falling.

Figure 1B:
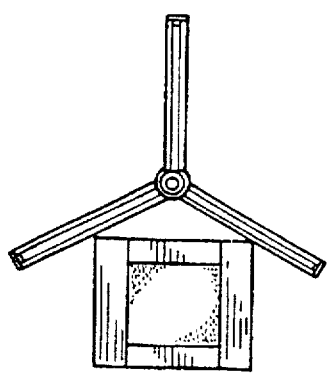
FIG. 1b illustrates a top view of the present invention in a separated and fully setup position.

Legs 3, 4 and 5, which may be adjustable in length (not shown), are operatively connected to center support 2. A first leg 3 is connected in a permanent manner to the center support 2 at upper ring 17a by a rigid connection (i.e. welded) 17b. A second leg 4 is connected to sleeve 16 which allows two degrees of motion (rotational and vertical). The collar 16 and attached leg 4 can rotate with respect to the vertical axis of the center support relative to the fixed first leg 3. The third leg 5 is attached to collar 14 which can rotate through an angle of 240 degrees with respect to the vertical axis of the center support relative to the fixed first leg 3. Knurled locking sleeve 13 is used to force collars 14 and 16 into a frictional non-rotational fixed relationship while in the setup position. In the transport configuration, the legs are aligned into a nested relationship (FIG. 1a) and the knurled locking sleeve rotated in threaded engagement 15 translating into upward linear movement until the rings 17a, 14 and 16 are secured against each other top to bottom. In a setup configuration (FIG. 1b), the legs are equidistantly separated (FIG. 4, etc.) and the knurled locking sleeve 13 rotated in threaded engagement 15 translating into upward linear movement until the rings 17a, 14 and 16 are secured against each other top to bottom. Feet 6 are used to stabilize the structure during the setup configuration.

Figure 8:
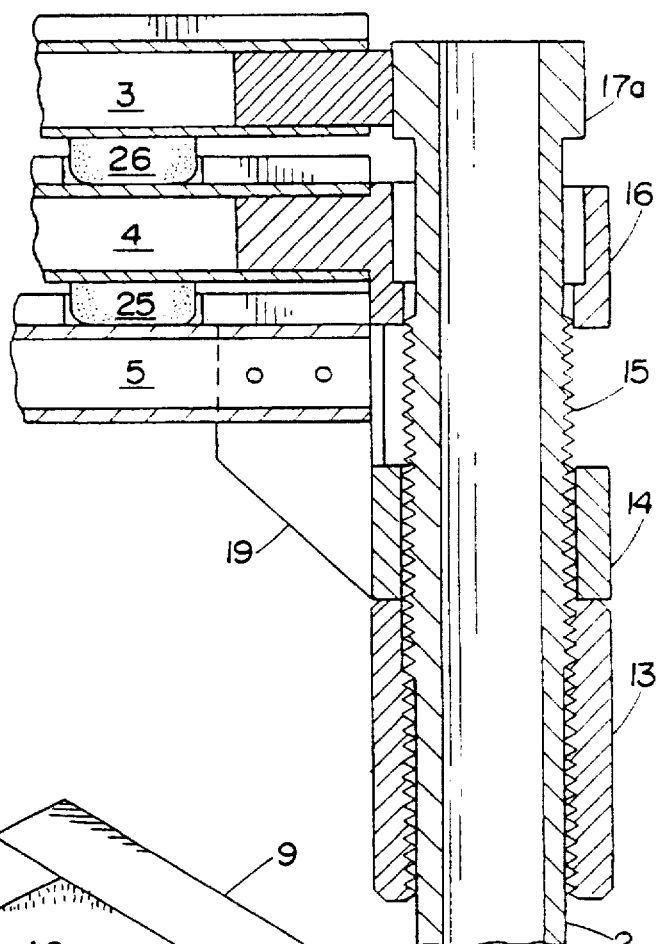
FIG. 8 illustrates a cutaway side view of the interlocking structure of the center support structure while in the transport position.

FIGS. 2, 3, and 4 illustrate the successive setup of the tripod riser. In FIG. 2, latches 12a and 12b have been unlatched and the stand section 8 removed. Knurled locking sleeve 13 is rotated creating an affective linear downward motion of the collar. Downward is defined as away from the lower collar 14. Once the collar is lowered approximately 3–6 inches, the second 4 and third 5 legs drop down away from permanently attached leg 3. Once free from the confines of the transport nested position, second leg 4 is rotated 120 degrees and raised upwardly to the level of the first leg 3. Collar 16 has an inner diameter slightly larger than the outer diameter of collar 17a (FIG. 8) and is retained in a friction fit in its setup position. FIG. 6 illustrates the fit between upper collar 17a and collar 16 when in the setup position. Collar 16 has a symmetric cutout section 42 to accommodate the width and height of collar 17a and leg 3. FIGS. 6 (top) and 7 (side) best illustrate the cutout section 42 and its interaction with section 17a and leg 3. Leg 4 also has a cutout section 20 to receive the underside of leg 3 during engagement. Leg 5 is then rotated 240 degrees and raised upward into grooves 18. Sections 41 represent narrow extensions of brace 19 formed as part of collar 14. FIGS. 6 (top) and 7 (side) best illustrate these sections. Upon placing the third leg 5 into position, threaded knurled locking sleeve 13 is rotated to raise it into contact with collar 14. The knurled locking sleeve 13 is then rotated until tight. The knurled locking sleeve 13 provides the necessary linear force to keep the legs in their respective positions during use in the setup position. FIG. 8 illustrates spacer sections 25 and 26 which keep a minimum distance between legs 3, 4 and 5 during transportation. The spacers prevent the legs from binding together while in the nested configuration. While the drawings illustrate two spacers 25, 26, a single spacer 26 may be used in the separation of legs 3 and 4 only.

The various figures illustrate screws, bolts and/or rivets for connecting the different pieces together. While these elements are not necessary for a complete understanding of the invention, these elements have been shown only for completeness. Any suitable means of fastening the various metal pieces of the nested structure 1 would be considered within the scope of the present invention. Bolts, screws, rivets and/or known welding techniques or other equivalent methods of fastening are acceptable. In addition, a securing strap (not shown) could be used to retain a tight fit of the three leg while in the nested transport position. The strap could be positioned to draw the first and third legs together in a semi-rigid manner. A first end of the strap would be attached to the first support leg and pulled tight and secured to the third support leg.

Figure 9:
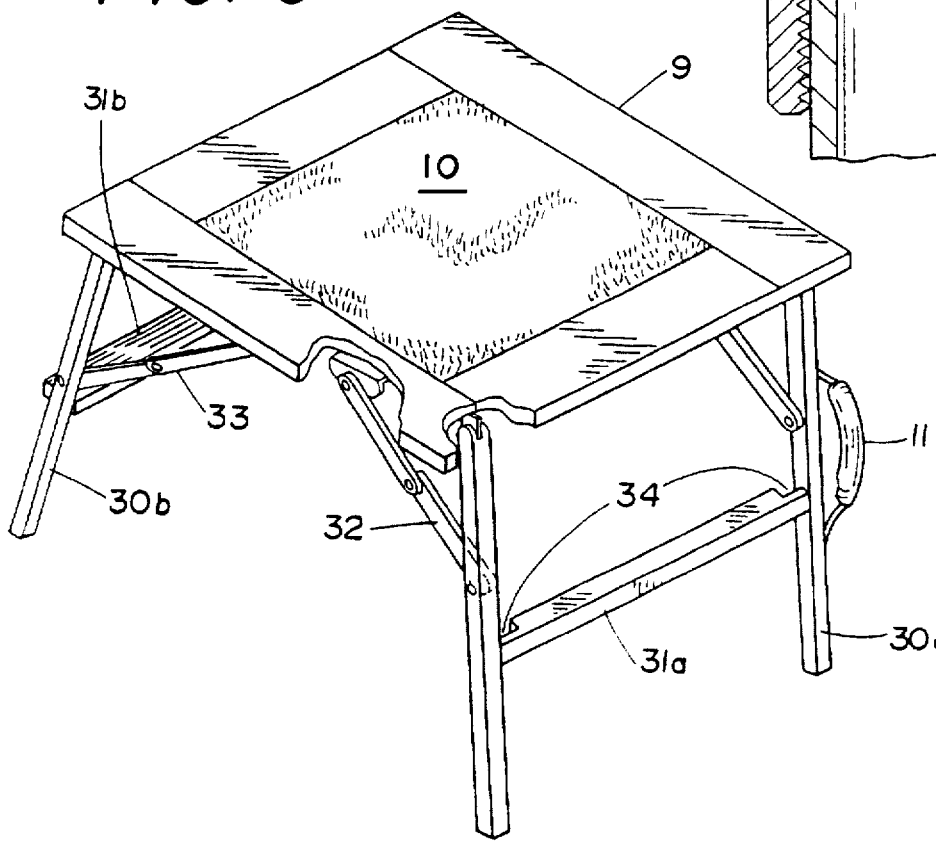
FIG. 9 illustrates the stand structure in the setup position.

FIG. 9 illustrates the stand 8 of the present invention. The stand has been designed to be strong, lightweight, sturdy under moving weight and compact in design. Being compact enables the stand to be slid into the interior section of leg 5 during transport. The stand comprises an upper platform 9 with interior center traction section 10. The center section 10 enables a user of the tripod to have tactile feedback as to the position of their feet with respect to the edge of the stand. The user can detect both a height and/or texture differential as they move their feet from the center 10 to the outer sections 9. The interior of the stand may comprise various lightweight supportive materials such as a honeycomb structure or aluminum wrapped honeycomb structure. Equivalent materials are deemed within the scope of the present invention.

The stand further comprises folding legs 30a and 30b with associated hinges 32 and 33. Cross bars 31a and 31b have a step section as well as under lying cross brace (not shown). Legs 30b are sightly narrower than those of 30a enabling them to rest within the legs 30b during folding. Legs 30b are folded first, with cutout sections 34 within the cross brace of step section 31a, receiving legs 30b as legs 30a are folded on top. Handle 11 comprises a comfort grip, possibly gel or foam filled or equivalents thereof, which enables carrying of the entire device when the stand is in latched attachment to the nested leg structure.

In operation, the device would be:

1. Carried to a desired filming or photographing location.
2. Stand 8 unlatched and removed.
3. Knurled locking sleeve 13 loosened.
4. Legs 4 and 5 rotated and translated into interlocking position.
5. Knurled locking sleeve 13 tightened.
6. Stand 8 legs 30a and 30b unfolded and secured into a locked position.
7. Stand 8 placed in close proximity to the riser section 1- see FIG. 1b.
8. A tripod placed upon the riser with each of its legs being retained within leg retaining sections 7.
9. The user would then stand on the stand 8 during the filming period.
10. Upon completion of filming, the tripod would be removed, the stand would be folded as per previous discussions above.
11. The knurled locking sleeve 13 would be loosened.
12. Legs 4 and 5 lowered and rotated into a nested configuration.
13. Knurled locking sleeve 13 tightened.
14. Stand 8 slid into the interior section of leg 5.
15. Latches 20a and 20b locked.
16. The entire device could then be transported for future use.

Listing of numeric designations:

1. Tripod riser in transport configuration (bottom view).
2. Center post support.
3. First support leg.
4. Second support leg.
5. Third support leg.
6. Feet for support legs.
7. Tripod leg receiving channels.
8. Integrated stand.
9. Top support surface for integrated stand.
10. Non-slip surface.
11. Handle.
12a and 12b. Retaining latches.
13. Knurled locking sleeve.
14. Retaining sleeve (collar) for third leg.
15. Mating threads for knurled locking sleeve.
16. Retaining sleeve (collar) for second leg.
17a and 17b. Fixed attachment of first leg to top collar.
18. Grooves within collar 16.
19. Brace for leg 5 and attachment to collar 14.
20. Cutout for receiving bottom of leg 3.
21. Screws for attachment.
25 and 26. Spacers.
30a and 30b. Folding legs.
31a and 31b. Steps and cross braces (not shown).
32 and 33. Paired hinges.

34. Cutouts to receive folded legs 30b.
40. Screws.
41. Extensions of brace 19.
42. Cutout of bracket 16.

CONCLUSION

A system and method has been shown in the above embodiments for the effective implementation of an integrated tripod riser. While various preferred embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by size, materials, connection methods, leg styles, handle position or composition, locking structures or surface textures.

I claim:

1. A portable tripod riser comprising:
   a center support post;
   a first support leg attached to said center support post;
   a second support leg rotatably attached to said center support;
   a third support leg rotatably attached to said center support;
   a locking sleeve retained on an outer circumference of said center support post, and
   wherein in a setup configuration, said first, second and third legs are equidistantly separated and locked into position by axial adjustment of said locking sleeve to compress the first, second and third support legs together and in a transport position, said first, second and third legs are axially aligned until coaxially nested and thereafter locked by axial adjustment of said locking sleeve thereby compressing said first, second and third support legs together.

2. A portable tripod riser as per claim 1, further comprising a removable stand which is retained with latches within an interior profile of said third support leg during the transport position.

3. A portable tripod riser as per claim 2, wherein said removable stand comprises a plurality of folding leg pairs which reside in a common plane in a folded position.

4. A portable tripod riser as per claim 3, wherein one of said folding leg pairs additionally comprises recessed sections for encapsulating a remaining folded leg pair during folding.

5. A portable tripod riser as per claim 3, wherein said removable stand further comprises a handle located on a side of one leg of a folding leg pair, said handle enabling carrying of both the removable stand as well as the tripod riser when in the retained position.

6. A portable tripod riser as per claim 2, wherein said removable stand further comprises a means of providing tactile feedback of the relative position of a user while standing on said removable stand.

7. A method of operating a portable tripod riser having an integrated stand latched thereto, a center post support and a first, second and third support leg operatively attached to said center post support comprising:
   unlatching one or more latches attaching said integrated stand to said portable tripod riser;
   removing said integrated stand from said tripod riser;
   unlocking a locking sleeve attached to said center post support;
   lowering said second support leg from a nested position, rotating the leg 120 degrees, raising the leg upward into an axially coupled relationship with said first support leg;
   lowering said third support leg, rotating 240 degrees, raising the leg upward into an axially coupled relationship with said second support leg;
   locking said locking sleeve by axial adjustment of said locking sleeve to compress one or more of said support legs together;
   unfolding stand legs attached to said stand, and
   placing said integrated stand in close proximity to said tripod riser.

8. A method of operating a portable tripod riser as per claim 7, wherein said removable stand is retained with latches within an interior profile of said third support leg during a transport position.

9. A method of operating a portable tripod riser as per claim 7, wherein said removable stand comprises a plurality of folding leg pairs which reside in a common plane in a folded position.

10. A method of operating a portable tripod riser as per claim 9, wherein one of said folding leg pairs additionally comprises recessed sections for encapsulating a remaining folded leg pair during folding.

11. A method of operating a portable tripod riser as per claim 7, wherein said removable stand further comprises a means of providing tactile feedback of the relative position of a user while standing on said removable stand.

12. A method of operating a portable tripod riser as per claim 7, wherein said removable stand further comprises a handle located on a side of one leg of a folding leg pair, said handle enabling carrying of both the removable stand as well as the tripod riser while in the latched position.

13. An integrated portable tripod riser comprising:
   a multiple support leg nested structure, each of said support legs having an upper channel for receiving a respective leg of a tripod;
   an inner cavity formed by an inner profile of said nested support leg structure;
   a removable stand, said stand retaining a planar form when collapsed;
   latching elements associated with at least a first of said nested support legs, and
   wherein said removable stand is secured within said inner cavity during a transport configuration and secured by said latching elements to said first nested support leg.

* * * * *